(12) United States Patent
Bernier et al.

(10) Patent No.: US 9,920,220 B2
(45) Date of Patent: Mar. 20, 2018

(54) CONDUCTIVE FILMS AND DEVICES COMPRISED THEREOF

(71) Applicant: The Research Foundation of State University of New York, Binghamton, NY (US)

(72) Inventors: William E. Bernier, Endwell, NY (US); Nicholas A. Ravvin, Brooklyn, NY (US); Wayne E. Jones, Jr., Vestal, NY (US); Kenneth H. Skorenko, Binghamton, NY (US)

(73) Assignee: The Research Foundation of State University of New York, Binghamton, NY (US)

( * ) Notice: Subject to any disclaimer, the term of this patent is extended or adjusted under 35 U.S.C. 154(b) by 730 days.

(21) Appl. No.: 14/212,559

(22) Filed: Mar. 14, 2014

(65) Prior Publication Data
US 2014/0272342 A1 Sep. 18, 2014

Related U.S. Application Data

(60) Provisional application No. 61/787,746, filed on Mar. 15, 2013.

(51) Int. Cl.
C09D 181/02 (2006.01)

(52) U.S. Cl.
CPC ..... *C09D 181/02* (2013.01); *Y10T 428/24942* (2015.01)

(58) Field of Classification Search
CPC .................. C09D 181/02; Y10T 428/24942
See application file for complete search history.

(56) References Cited

U.S. PATENT DOCUMENTS

| 6,664,355 B2 | 12/2003 | Kim et al. |
| 2003/0045663 A1 | 3/2003 | Kim et al. |
| 2006/0269664 A1* | 11/2006 | Gleason ............ B05D 1/60 427/248.1 |
| 2007/0071987 A1* | 3/2007 | Winther-Jensen ... C08G 61/126 428/474.4 |

(Continued)

FOREIGN PATENT DOCUMENTS

GB 2169608 7/1986

OTHER PUBLICATIONS

Definition of Flexible.*

(Continued)

*Primary Examiner* — Maria Veronica Ewald
*Assistant Examiner* — Travis Figg
(74) *Attorney, Agent, or Firm* — Paul Frank + Collins P.C.

(57) ABSTRACT

Embodiments of films and material layers comprising PEDOT. These embodiments are the result of methods that utilize polymerization processes including vapor phase polymerization (VPP) to form the conductive film comprising PEDOT. In one embodiment, the film can result from a method that includes steps for depositing a coating solution onto a substrate, exposing the substrate to a monomer source, and cleaning the substrate after polymerization. The coating solution can comprise an initiating oxidant, which facilitates growth of PEDOT from 3,4 ethylenedioxythiophene (EDOT), as well as a quenching agent that neutralizes acid that results from polymerization.

17 Claims, 13 Drawing Sheets

(56) References Cited

U.S. PATENT DOCUMENTS

| | | | | |
|---|---|---|---|---|
| 2010/0163808 A1* | 7/2010 | Chen | ................... | C08G 61/124 |
| | | | | 252/500 |
| 2010/0273063 A1* | 10/2010 | Wallace | ................ | H01G 9/022 |
| | | | | 429/317 |
| 2011/0315204 A1* | 12/2011 | Gleason | ................ | B82Y 10/00 |
| | | | | 136/256 |

OTHER PUBLICATIONS

West et al. ("Vapor-Phase Polymerization of 3,4-Ethylenedioxythiophene: A Route to Highly Conducting Polymer Surface Layers" Macromolecules 2004, 37, 4538-4543).*

Murphy et al. ("Structure-directed growth of high conductivity PEDOT from liquid-like oxidant layers during vacuum vapor phase polymerization" J. Mater. Chem., 2012, 22, 14889).*

Zuber et al. ("Improved PEDOT Conductivity via Suppression of Crystallite Formation in Fe(III) Tosylate During Vapor PHase Polymerization" Macromol. Rapid Commun. 2008, 29, 1503-1508).*

Murphy et al. ("High conductivity PEDOT resulting from glycol/oxidant complex and glycol/polymer intercalation during vacuum vapour phase polymerisation" Polymer 2011, 52, 1725-1730).*

West et al. (Base inhibited oxidative polymerization of 3,4-ethylenedioxythiophene with iron(III)tosylate Synthetic Metals, 2005, 152, 1-4).*

* cited by examiner

CONDUCTIVE FILMS AND DEVICES COMPRISED THEREOF

CROSS-REFERENCE TO RELATED APPLICATIONS

This application claims the benefit of priority to U.S. Provisional Application Ser. No. 61/787,746, filed on Mar. 15, 2013 and entitled "CONDUCTIVE FILMS AND DEVICES COMPRISED THEREOF," which is incorporated by reference herein in its entirety.

STATEMENT REGARDING FEDERALLY SPONSORED RESEARCH AND DEVELOPMENT

This invention was made with government support under Grant HR0011-10-1-0002 awarded by DARPA and The Office of Naval Research Award N00014-11-1-0658. The government has certain rights in this invention.

BACKGROUND

The present disclosure describes subject matter that relates to conductive films with particular discussion about conductive films comprising poly(3,4-ethylenedioxythiophene) ("PEDOT").

Thin films and similar coatings and overlayments find use in many applications. For example, conductive films are found in a variety of consumer electronics (e.g., phones, televisions, tablet computers, videogames, etc.). These conductive films also enhance construction of solar cells, light-emitting diode (LED) devices, and other devices for use in many industrial applications.

Conductive films can utilize materials across a wide swath of conventional technologies. These materials can include, for example, silver nanowires, graphene, carbon nanotubes, micro-fine wire, metal mesh (embossed, directly printed, and etched), and similar nano-scale and micro-scale technologies. Many conductive films find particular use of indium tin oxide (ITO). In addition to favorable conductivity, this material affords the resulting conductive films with other characteristics (e.g., transparency) that make the films amenable to the wide range of applications mentioned above. ITO is, however, a product of indium, which is a raw material in relatively short supply and, accordingly, continues to increase in price with demand growth for thin, conductive films. Moreover, although favored for certain characteristics, films that utilize ITO can suffer from cracking and brittle failures when subject to bending. This feature somewhat limits use of these ITO-based films in combination, e.g., with flexible substrates.

Conductive polymers may address concerns with ITO-based films to provide candidate materials for use in connection with flexible electronics. For example, poly(3,4-ethylenedioxythophene) (also "PEDOT") and like conjugated polymers are conducting polymers with good stability and optical transparency. These properties afford this polymer with suitable conductivity and transparency for use, e.g., in material layers on organic photovoltaics and LED devices. For other applications and/or manufacturing purposes, PEDOT often requires additional processes that synthesize the material to improve certain characteristics (e.g., conductivity) and/or properties (e.g., solubility). These processes may, for example, synthesize PEDOT in the presence of polystyrenesulfonate (PSS) to form solutions (also, "PEDOT:PSS solutions") and/or initiate polymerization (e.g., vapor phase polymerization (also, "VPP")), which results in films (also, "VPP:PEDOT films") with attractive conductivity and transmission characteristics.

SUMMARY OF THE INVENTION

The present disclosure contemplates embodiments of films and material layers comprising PEDOT. These embodiments have a crystalline structure that is favorably organized for the films to achieve conductivity in excess of 1000 S/cm, well above most conventional technologies and suitable for use as a replacement for ITO-based films. This crystalline structure is the result of methods that utilize polymerization processes to grow the films, e.g., on a substrate. Embodiments of these methods utilize process protocols that define parameters (e.g., temperature, time, materials and constituent components, concentrations, etc.) to facilitate growth of PEDOT from 3,4 ethylenedioxythiophene (EDOT).

Broadly, the methods below utilize polymerization processes, namely, vapor phase polymerization (VPP) that involves the oxidation of the EDOT monomer to form PEDOT. These methods can implement several steps that include, for example, a step for depositing an coating solution onto a substrate. This step forms a material layer on the substrate. The substrate is then subject to another step for exposing the layer to the EDOT monomer in a sealed chamber. This step leverages an oxidant in the coating solution, thereby resulting in a material layer on the substrate that can initiate the free radical polymerization of the EDOT monomer to form PEDOT. After polymerization, the method can also include a step for applying a cleaning solution to the substrate to remove residual materials that build-up on the film.

The process protocol defines parameters that may set out metes and bounds for operation of the various steps of the methods. The parameters can define the constituent components as well as, for example, a concentration of constituent components in the precursor solutions and compositions that facilitate growth of PEDOT films. For deposition of the oxidant, for example, the coating solution may comprise the oxidant and a quenching agent that is formulated to remove hydrogen from the monomer source during polymerization. The cleaning solution may comprise isopropanol; although this disclosure does contemplate 1-butanol and like solutions as desired.

The parameters can also establish temperature, time, and like controls for the steps of the method. In the cleaning step, for example, the method can utilize a cleaning time (e.g., about 3 minutes or less) that defines the time the cleaning solution is introduced to the resulting PEDOT film. The method can also utilize an exposure temperature and exposure time, both of which influence the polymerization process. As noted below, the method can implement polymerization at higher temperatures (e.g., in a range from about 40° C. to about 60° C.) for shorter times (e.g., less than 60 minutes) than similar processes that utilize VPP to form conductive PEDOT films.

BRIEF DESCRIPTION OF THE DRAWINGS

Reference is now made briefly to the accompanying Appendix in which.

Where applicable like reference characters designate identical or corresponding components and units throughout the several views, which are not to scale unless otherwise indicated.

DISCUSSION OF EMBODIMENTS

Figure 1:
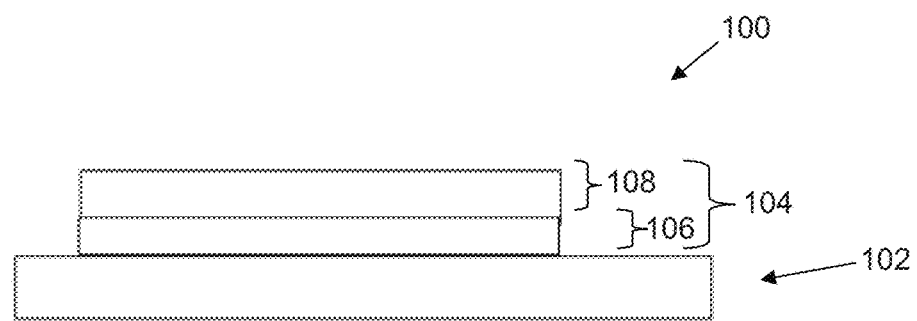
FIG. 1 depicts a schematic diagram of an exemplary device that utilizes conductive films and/or material layers.

FIG. 1 depicts an exemplary device 100 that benefits from implementation of VPP polymerization processes set out herein. The device 100 includes a substrate 102 and one or more material layers (e.g., a first layer 104). The material layer 104 has one or more regions (e.g., a first region 106 and a second region 108).

At a relatively high level, the material layer 104 embodies a polymer film that is favorable for use to conduct electricity (and/or electrical signals) in myriad of applications. This film has a crystalline structure that is highly defined, or well-structured, to promote both high conductivity and optical transparency. Examples of the material layer 104 can include films that comprise poly(3,4-ethylenedioxythiophene) (also "PEDOT"). These films have relatively good conductivity, for example, with respect to conventional PEDOT:PSS, and are transparent and/or exhibit optical properties that transmit light therethrough. In one embodiment, the first region 106 proximate the substrate 102 exhibits conductivity that is greater relative to the conductivity of the second region 108. This feature may result from a higher concentration of conductive materials (e.g., metals) that build-up in the first region 106 (as compared to the concentration of conductive materials in the second region 108) during manufacture of the device 100 as set forth herein.

The substrate 102 may include flexible and/or rigid materials. Examples of flexible materials have structure that can vary in shape, e.g., by way of bending and/or twisting. These features allow the device 100 to conform to various shapes and applications. In one implementation, the first layer 104 is likewise flexible and maintains conductivity under deformation. Suitable materials for the substrate 102 can include various plastics which include thermoplastic (e.g., polyethylene terephthalate (PET)) and other materials that might find use, for example, in flexible electronic circuits, e.g., polyimide, polyether ether ketone (PEEK), etc. Rigid materials can include glass, however, this disclosure contemplates applications that utilize rigid plastics, metals, and combinations and derivations thereof.

Figure 2:
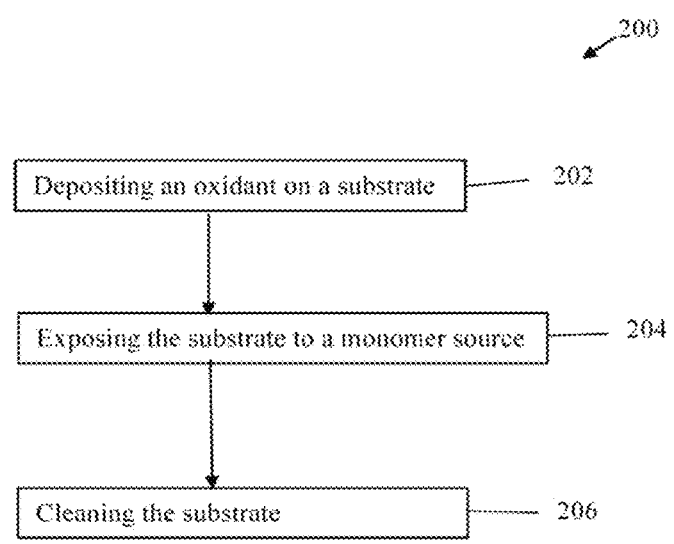
FIG. 2 depicts a flow diagram of a processing method for generating conductive films and/or material layers.

FIG. 2 depicts a flow diagram of a method 200 that is useful to manufacture polymer films with crystalline structure that offers the favorable conductivity and other properties discussed herein. The method 200 includes, at step 202, depositing an oxidant on a substrate, at step 204, exposing the substrate to a monomer source and, at step 206, cleaning the substrate. Collectively, these steps induce vapor phase polymerization (VPP) of a polymer that forms a material layer (e.g., first layer 104 of FIG. 1) on the substrate (e.g., substrate 102 of FIG. 1). The material layer comprises PEDOT, forming a PEDOT film having the crystalline structure that is configured for favorable conductivity and optical transparency, as relates to other PEDOT-based films and materials developed using conventional techniques.

The step of depositing an oxidant (e.g., at step 202) prepares the substrate with material that is a precursor to the PEDOT film. This material may have a composition that facilitates the formation of the PEDOT film with properties (e.g., conductivity) favorable for use, e.g., to replace ITO. This composition may, for example, neutralize acid that develops during polymerization, without inhibiting the polymerization process. Notably, conventional techniques often utilize compositions that are configured to stop (or inhibit) the polymerization process in order to form PEDOT films. These conventional techniques utilize a polymerization inhibitor that removes free radical ions to prevent further polymerization of PEDOT during the polymerization process. The polymerization inhibitor typically addresses issues with oligomers that arise due to excess polymerization. These oligomers can lower conductivity and adhesion of the resulting PEDOT film because the oligomers become loosely bound to the polymer. As noted herein, the compositions found in embodiments of the method 200 are not formulated to inhibit the polymerization process nor, for example, address oligomer build-up. Rather the method 200 is configured with steps (e.g., at step 206) to clean the substrate in a manner that effectively removes loosely bound oligomers after polymerization is complete.

In one embodiment, the method 200 may include a step for depositing a coating solution to form the material layer on the substrate. The coating solution can have a composition that includes one or more constituent components that are likewise found in the material layer on the substrate after deposition, but before polymerization. These constituent components may include the oxidant. In one implementation, the composition comprises a concentration of the oxidant of about 0.15M or less and, in one example, the concentration of the oxidant is in a range of about 0.07 to about 0.15M. The constituent components can also include a quenching agent that is formulated (e.g., in an amount and/or concentration) to remove hydrogen from the polymer, but that does not inhibit the polymerization process. In one implementation, the composition of the coating solution can have a concentration of the quenching agent that is about 0.08M or less, with particular formulations having concentrations in a range of about 0 to about 0.08M. For those concentrations in the lower bound (e.g., at or near 0), the coating solution may utilize oxidants (e.g., Cu) that operates to neutralize acid. In other examples, the quenching agent removes protic hydrogens, which is beneficial to neutralize acid that develops during the polymerization process. The build-up of this acid can result in the film being non-conductive (or of lower conductivity) because the film cannot be doped by counter ions. Examples of the quenching agent include pyridine, sodium hydroxide, ammonium hydroxide, and like materials.

Examples of oxidants can include materials and compositions with conductive properties. These materials can metals, metallic materials, metallic ions, etc. Suitable oxidants include iron (iii) p-toluenesulfonate ($Fe(OTs)_3$), copper chloride ($CuCl_2$), and copper (ii) trifluoromethylsulfonate ($Cu(FMS)_{j2}$). This disclosure, however, contemplates a wide range of materials that can be disposed on the substrate for purposes of facilitating polymerization under one or more protocols and processes. The oxidants may also include Fe(III)halide(s), Cu(II) halide(s), $Cu(OTs)_2$, and combinations and derivations thereof. The oxidant can comprise Fe(III) oxidants that comprise counter ions comprising one or more of chloride, bromide, and p-toluenesulfonate. In one implementation, the oxidant can comprise one or more of chloride, bromide, p-toluenesulfonate, and trifluoromethylsulfonate.

Figure 3:
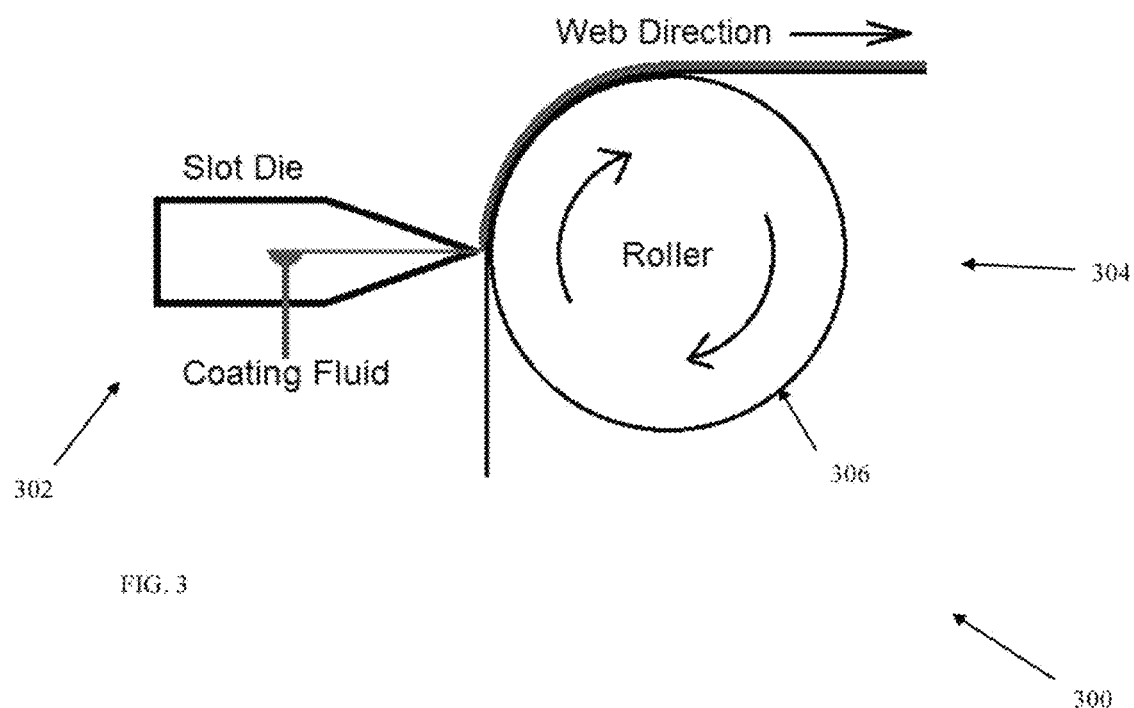
FIG. 3 depicts an example of an apparatus to deposit coating solution onto a substrate.

For process implementation, deposition of the coating solution can utilize various deposition techniques that can spread fluids (e.g., the coating solution) onto a surface. Examples of these techniques include spin-coating, sputtering, screen printing, spray coating, dip coating, and the like. Selection of the appropriate technique to adequately disperse the coating solution across the surface of the substrate may depend on properties (e.g., wettability) of the coating solution. In one implementation, the first layer has a thickness from about 1 nm to about 5 nm before the monomer source polymerizes the first layer. FIG. 3 illustrates one example of a coating system 300 that is useful for deposition in scaled-up production and/or manufacturing. The system 300 includes a deposition component 302 and an advancing component 304 that includes, in one example a roller element 306. During operation, the roller element 306 can translate the substrate relative to the deposition component 302 which, in turn, deposits coating solution onto the substrate.

The step of exposing the substrate to the monomer source (e.g., at step 206) facilitates formation of the PEDOT layer or film. This step can result in the polymer layer with a thickness of about 70 nm to 120 nm; however, this disclosure contemplates implementations of the method 200, and related aspects of this discussion, that can permit formation of the polymer layer of in excess of 120 nm and less than 70 nm, as desired. The monomer source can include material that reacts with the oxidant to form the material layer. The exemplary polymer discussed above comprises 3,4 ethylenedioxythiophene (EDOT). Examples of other polymers include 3,4 propylenedioxythiophene, 3,4 butylenedioxythiophene, and combinations and derivations thereof.

Figure 4:
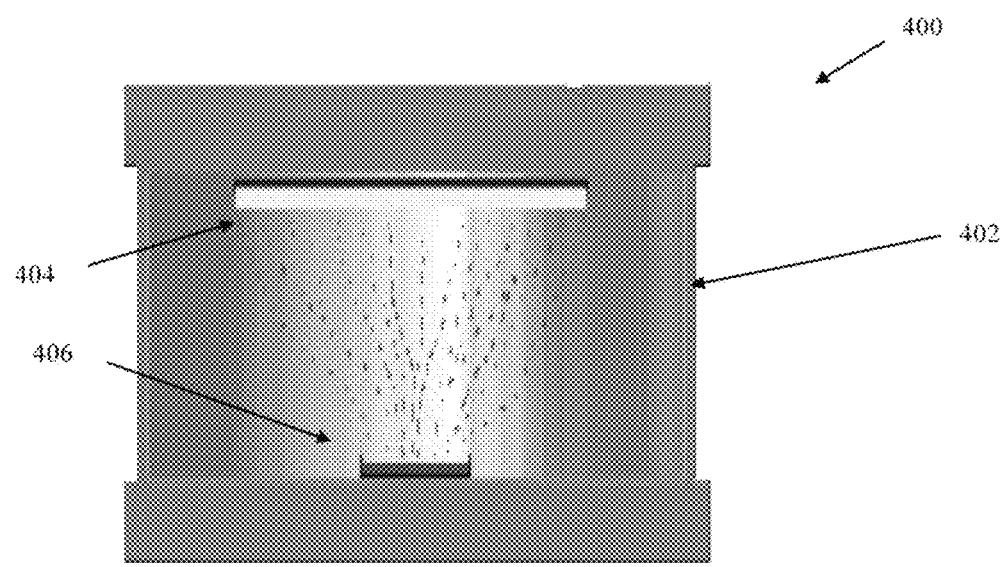
FIG. 4 depicts an example of an apparatus in which polymerization can occur.

FIG. 4 illustrates an example of an apparatus 400 that is useful for exposing the substrate to the monomer source. The apparatus includes a chamber 402, which is preferably sealed to regulate conditions inside of the chamber 402 during polymerization. Examples of the chamber 402 can be configured to suspend the substrate 404 in position to expose the oxidant layer to vapor from the monomer source 406. For larger scale production, the concepts of the closed chamber may scale-up to accommodate greater throughput as necessary. Large scale fabrication may, for example, combine concepts for deposition (FIG. 3) and polymerization (FIG. 4) on a process line.

With reference back to FIG. 2, the step of cleaning the substrate (e.g., at step 206) can remove residue that remains from polymerization. As noted above, the cleaning solution can comprise one or more constituent components that are amenable to clean the substrate in a manner that effectively removes loosely bound oligomers from the film. These constituent components can comprise isopropanol, although other alcohol-based and derivatives are contemplated herein. In one embodiment, the method can includes steps to utilize a dispersing element to disperse the cleaning solution onto the substrate. This dispersing element may utilize spray, dipping, and/or any number of techniques that can introduce the cleaning solution in amounts sufficient to remove residue, e.g., from the PEDOT film.

The method 200 relies on process parameters to define aspects, steps, and other facets that facilitate formation of the PEDOT films. Implementations of the method 200, for example, may include one or more steps for selecting and/or tuning process parameters (e.g., temperature, time, concentration of polymer, concentration of oxidant, etc.) to achieve characteristics of the material layer, as desired. This disclosure contemplates a wide range of values for the process parameters, the selection of which may depend, for example, on the type, composition, and material properties of the substrate, oxidant, and polymer. For example, the process parameters can define the temperature (e.g., an exposure temperature) and time (e.g., an exposure time) for the polymerization process. The exposure temperature for the method 200 resides in a range of from about 40° C. to about 60° C. In one embodiment, the range is from about 50° C. to about 60° C. and, in one particular implementation, the exposure temperature is about 50° C. (±2° C.). The exposure time for the method 200 is, for example, 60 minutes or less, although in some embodiments the exposure time can reside in a range of from about 30 minutes to about 60 minutes. In addition to the polymerization process, the parameters can also defined a cleaning time, which typically maintains the application of cleaning solution to the substrate at or around 3 minutes or less. Unlike conventional processes, these parameters result in crystalline structure for PEDOT film with favorable mechanical properties (e.g., deformable and flexible), electrical properties (e.g., a conductivity of 300 S/cm or greater and a resistivity that deviates by only ±10% during flexure), optical properties (e.g., optically transparent), among other favorable properties that make the PEDOT film a suitable replacement for conventional ITO materials.

Discussion of Experimental Results

In light of the foregoing, the discussion that follows uses non-limiting examples to describe features of the PEDOT films that can result from the methods contemplated herein. These examples characterize properties of examples of PEDOT films to illustrate the viability of the PEDOT films are replacement for, e.g., ITO materials. These properties include, for example, conductivity, resistivity under cycling, transmittance/transparency, and diffraction.

EXAMPLE I

Example I compares two samples of PEDOT to illustrate the favorable properties of VPP-PEDOT.

"Sample 1" was prepared using vapor phase polymerization (VPP) processes. This process utilized a solution of iron (III) p-toluenesulfonate hexahydrate in butanol that was spin-coated onto clean polyethylene naphthalate (PEN) or polyethylene terephthalate (PET) substrates. The coated substrates were heated at 75° C. for 3 min in order to evaporate excess butanol. The substrates were suspended above liquid EDOT monomer in a polymerization chamber held at a constant temperature of 50° C. The polymerization reaction was allowed to proceed for 45 minutes to obtain PEDOT films. Polymerized films were rinsed with ethanol and dried under a stream of nitrogen gas.

"Sample 2" was prepared using in-situ deposition of PEDOT. This process utilized a monomer solution of EDOT in acetonitrile and an oxidant solution of iron (III) chloride hexahydrate in acetonitrile. One surface of clean PET substrates was masked with tape, and the substrates were suspended in the monomer solution. During preparation, the oxidant solution was added to stirring monomer solution in order to completely submerge the substrates. The resulting mixture was allowed to stir for variable amounts of time in order to obtain thin films. The polymerized films were rinsed with ethanol and dried under a stream of nitrogen gas.

Figure 5:
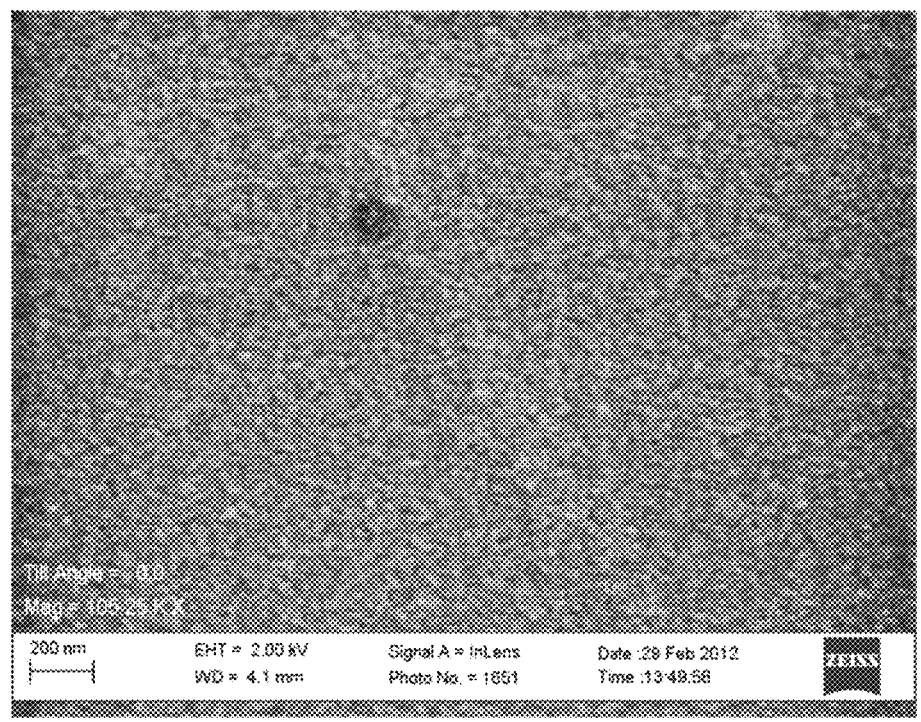
FIG. 5 depicts an SEM image of an example of a VPP-PEDOT film using $Fe(OTs)_3$ as an oxidant.
Figure 6:
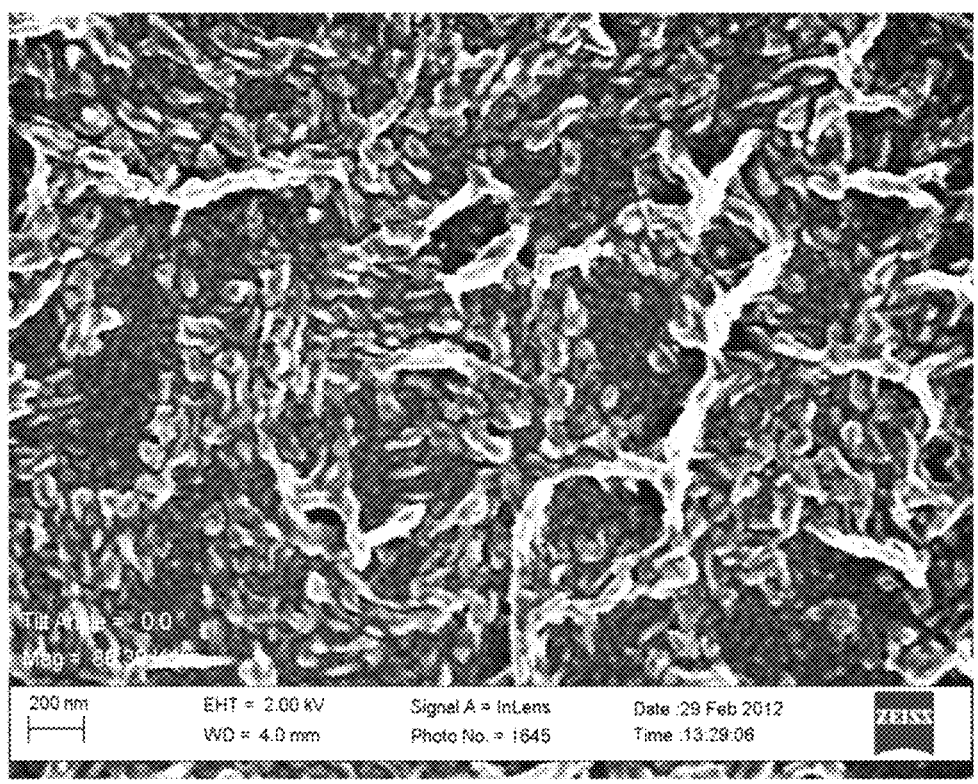
FIG. 6 depicts an SEM image of an example of a VPP-PEDOT film using $CuCl_2$ as an oxidant.

FIGS. 5 and 6 depict SEM images of the PEDOT films using $Fe(OTS)_3$ (Sample 1 in FIG. 5) and $CuCl_2$ (Sample 2 in FIG. 6) to investigate surface morphologies. As shown in FIG. 5, PEDOT films prepared using $Fe(OTS)_3$ as the oxidant exhibit uniform morphology across the surface of the substrate. Conversely, the SEM image of FIG. 6 shows that PEDOT films prepared using $CuCl_2$ as the oxidant exhibit rough surface morphology, which is likely the result of oligomer growth during the polymerization.

Figure 7:
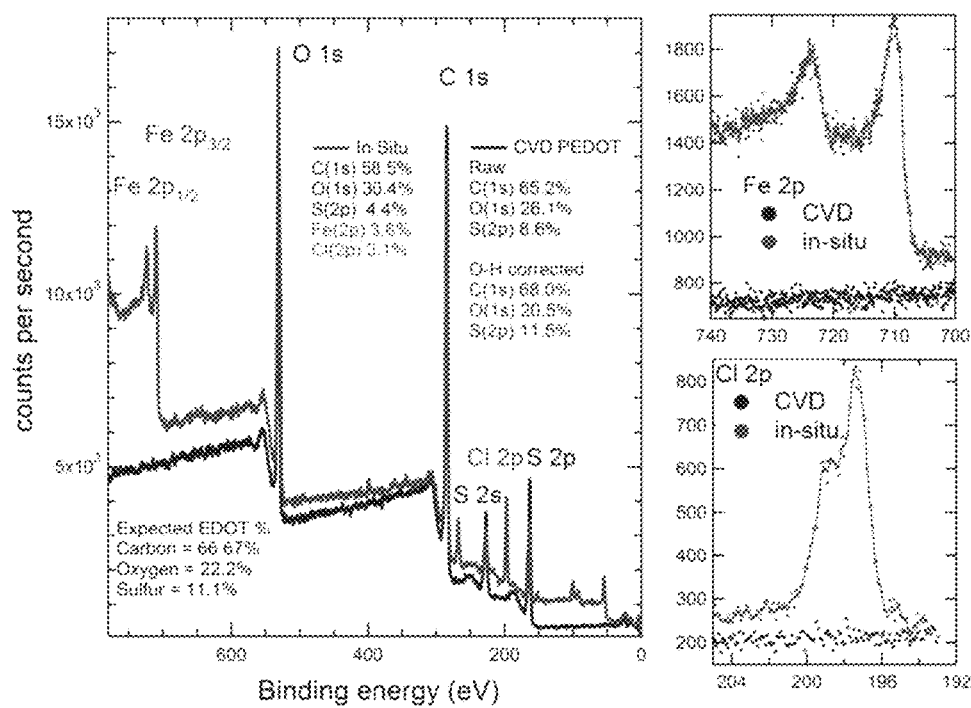
FIG. 7 depicts a plot of data that reflects a that represents analysis of examples of VPP-PEDOT films using X-ray photoemission spectrometer (XPS)

FIG. 7 depicts a plot of data that represents analysis using X-ray photoemission spectrometer (XPS) to study the surface chemistry of thin VPP-PEDOT (20 nm) (Sample 1) and in-situ PEDOT (50nm) (Sample 2). This plot shows that the composition of the VPP-PEDOT was close to the stoichiometry of the EDOT molecule (accounting for adventitious oxygen). However, in contrast to the in-situ PEDOT case, no Fe signal was detected for the VPP-PEDOT. This feature indicates that, considering the effective escape depth of the Fe 2p photoelectrons, any residual Fe from the oxidant must be restricted to an interfacial region (e.g., the first region 106 of FIG. 1) that is about 15 nm between the substrate and VPP-PEDOT.

Figure 8:
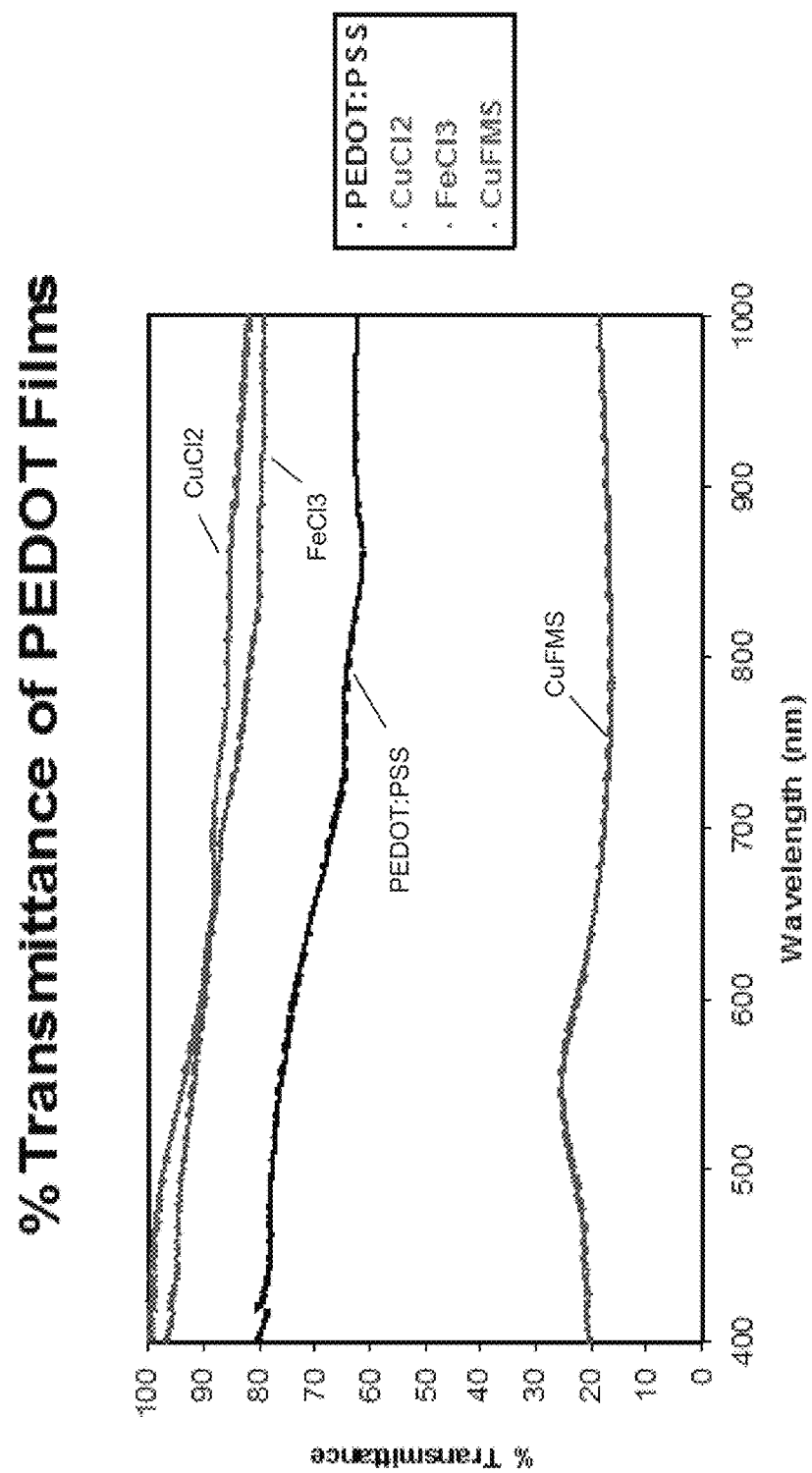
FIG. 8 depicts a plot of data that reflects the transmission spectra of examples of VPP-PEDOT films.

FIG. 8 depicts a plot of data that reflects the transmission spectra in the UV-visible region for samples of VPP-PEDOT and in-situ PEDOT using a Perkin-Elmer Lambda Series/PECSS. As shown in FIG. 7, the transmittance of VPP-PEDOT on PET using CuFMS as the oxidant is approximately 20%, whereas the transmittance of VPP-PEDOT using either $CuCl_2$ or $Fe(OTS)_3$ are above 80%, effectively approaching the transmittance of commercially available ITO films.

TABLE 1 below reflects the conductivity of films of various composition.

TABLE 1

| Sample | Average Thickness (nm) | Conductivity (S/cm) |
| --- | --- | --- |
| VPP $Fe(Ots)_3$ | 78 | 1340 ± 136 |
| VPP $CuCl_2$ | 125 | 7.1 ± 1.1 |
| VPP $Cu(FMS)_2$ | 125 | 7.7 ± 8.3 |
| PEDOT:PSS | 80 | 188 ± 30 |
| In-situ | 105 | 126 ± 10 |

Example I demonstrates properties for flexible PET substrates that were coated with a conducting layer of PEDOT by means of in-situ polymerization (Sample 2) and VPP processes (Sample 1) utilizing process protocols that include, for example, exposure temperatures of 50° C. in addition to various spin-coating speeds and oxidants. Although in-situ phase polymerization yielded good results, data from the VPP samples illustrate superior characteristics for use of the VPP-PEDOT as a replacement for ITO. First, VPP-PEDOT films have markedly higher conductivities. Second, VPP-PEDOT films have higher transmittance in the UV-visible region. Third, multiple copper (II) oxidants are viable in VPP processes but not, on the other hand, in in-situ reactions, which is preferable to iron due to the potential to reduce titanium in the adjacent electron conducting layer of the solar cell. Fourth, by lowering spin coating speeds for oxidant deposition is observed to increase conductivities by an order of magnitude.

EXAMPLE II

Examples II offers data that characterizes PEDOT films made in accordance with the methods and process disclosed herein. This data includes comparative data for conventional conductive films.

TABLE 2 below details conductivities (in S/cm, using a 4 probe voltmeter) of conductive films formed using various processes. Sample 1 is the result of a method (e.g., method 200) that implements a process protocol in accordance with the present disclosure. This process protocol utilizes an exposure temperature of 50° C., an exposure time of 45 minutes, and a concentration of oxidant in the coating solution of 0.14M.

TABLE 2

| Sample | Process | Sample Type | Avg. Thickness (nm) | Conductivity (S/cm) |
| --- | --- | --- | --- | --- |
| 1 | VPP | $Fe(OTS)_3$ p-toluenesulfonate | 78 | 1296 ± 169 |
| 2 | Sputtering | ITO | — | ~10,000 |
| 3 | Spin Coating | PEDOT:PSS | 80 | 188 ± 30 |
| 4 | Solution | $FeCl_3$ | 71 | 52 ± 5 |
| 5 | VPP | $Fe(OTS)_3$ | 24 | 575 ± 83 |
| 6 | VPP | $CuCl_2$ | 125 | 46 ± 6.0 |

As shown in TABLE 2 above, the VPP-PEDOT film made in accordance with the disclosed techniques and process protocols (and $Fe(OTs)_3$ as oxidant) exhibits conductivity in excess of about 1000 S/cm.

Figure 9:
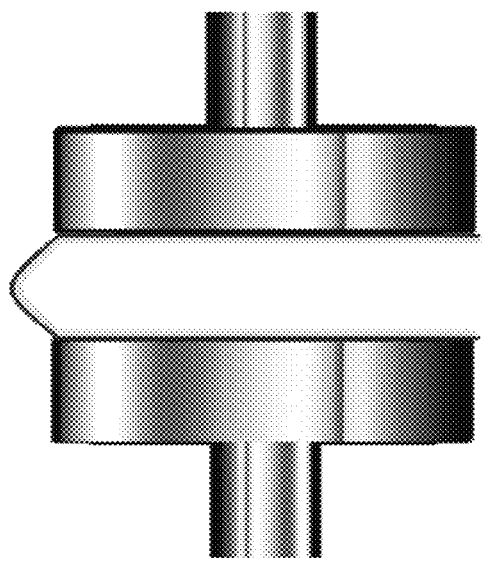
FIG. 9 depicts a schematic diagram of a test apparatus for flexing an example of a VPP-PEDOT film, wherein the film is shown in a first flexure dimension.
Figure 10:
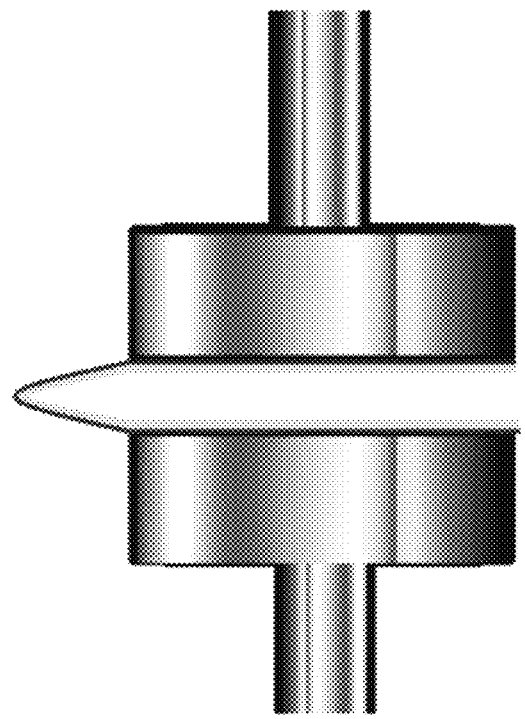
FIG. 10 depicts the test apparatus of FIG. 9 with the film in a second flexure dimension.
Figure 11:
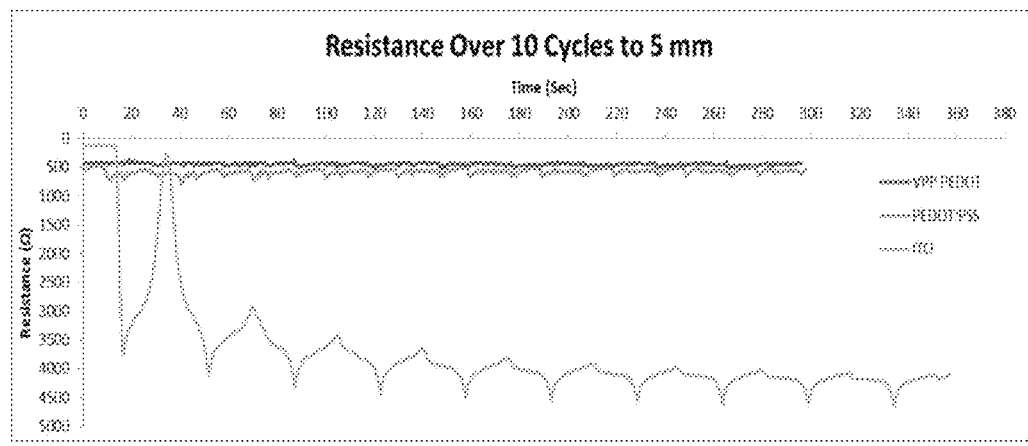
FIG. 11 depicts a plot of data for fatigue testing for an example of a VPP-PEDOT film in comparison to other conductive films.
Figure 12:
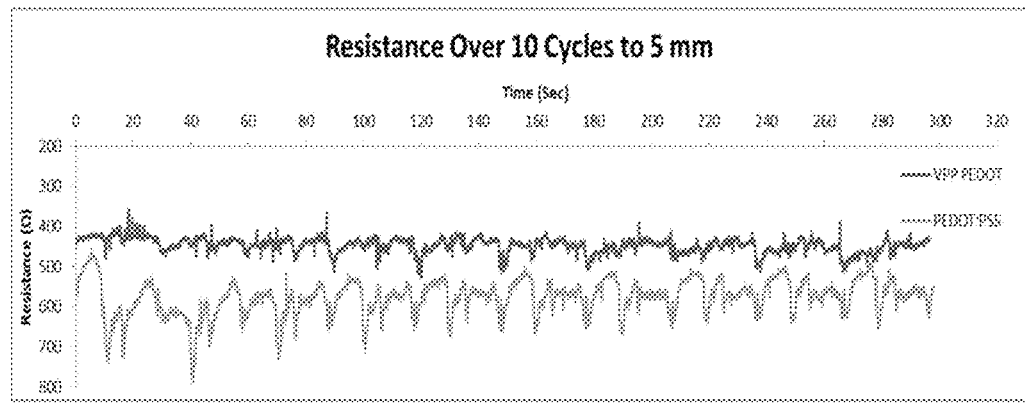
FIG. 12 depicts a detail view of the plot of data in FIG. 11.

FIGS. 9, 10, 11, and 12 show plots of data that characterize the effect of fatigue testing on the resistance of conductive films. FIGS. 9 and 10 illustrate an example of the fatigue test stand in which the samples were cycled between two flexure dimensions (e.g., a first flexure dimension in FIG. 9 and a second flexure dimension in FIG. 10). FIG. 11 provides data that compares resistivity of VPP-PEDOT film, PEDOT:PSS film, and ITO film during fatigue testing of about 10 cycles. FIG. 12 shows a detail view of this data, focusing on VPP-PEDOT film and PEDOT:PSS film. Notably, the VPP-PEDOT film of the present disclosure outperforms each of the other films, maintaining resistivity of 400Ω±40Ω over the duration of testing for a 6 cm long film.

Figure 13:
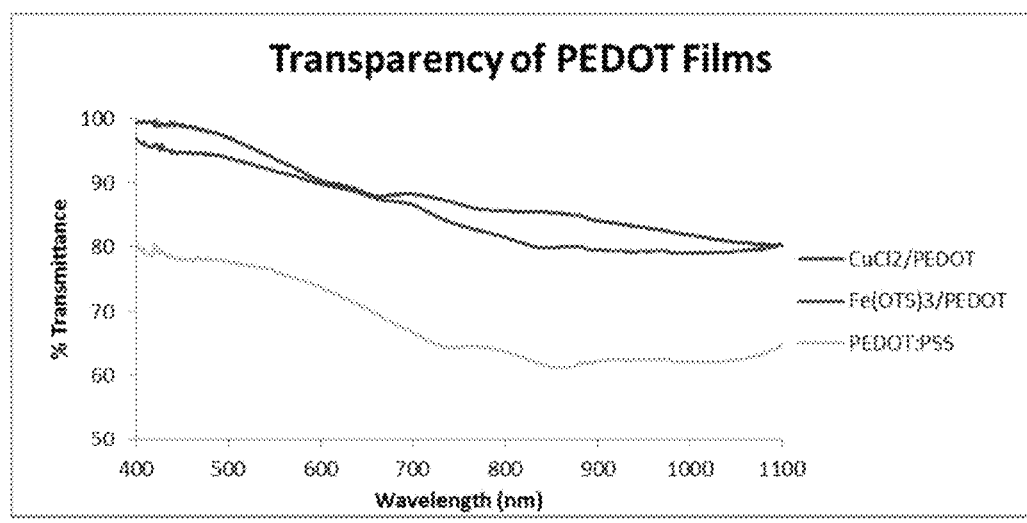
FIG. 13 depicts a plot of data for the transmission spectra of examples of VPP-PEDOT films.

FIG. 13 depicts plots of data that relates to the transmission spectra in the UV-visible region of conductive films. As shown by the plots, the PEDOT films comprising $CuCl_2$ and Fe(OTs)$_3$ oxidants exhibit excellent transmission in excess of 85% for wavelengths of 1000 nm or less.

EXAMPLE III

Examples III focuses on characterization of the structure of the PEDOT films made in accordance with the methods set forth herein. The method utilized a process protocol with an exposure temperature of 50° C., an exposure time of 45 minutes, and a concentration of oxidant in the coating solution of 0.14M.

Figure 14:
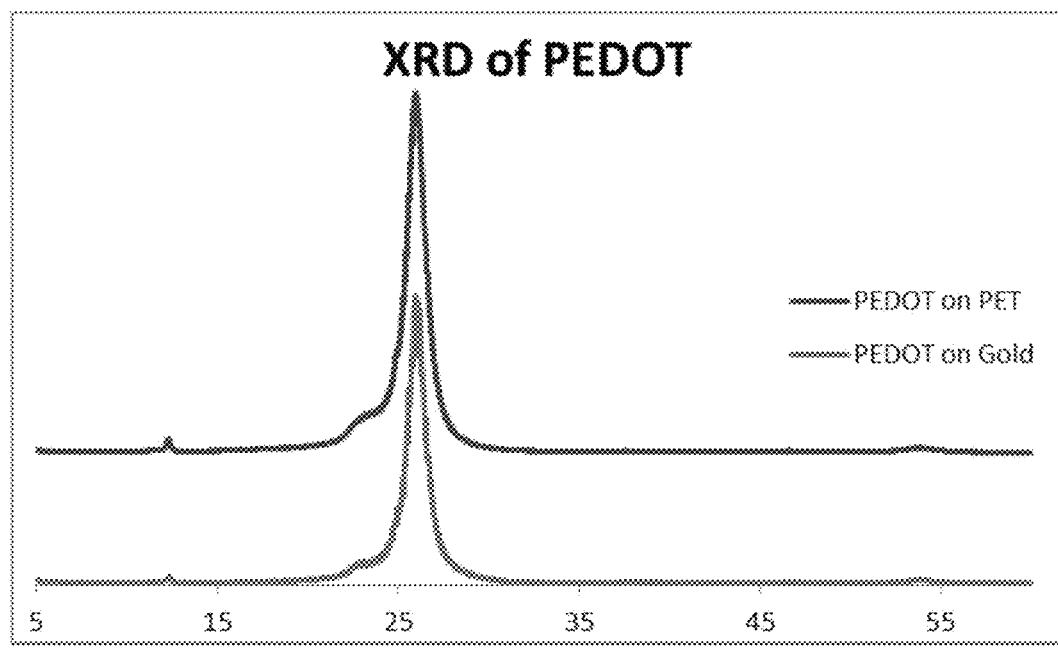
FIG. 14 depicts a plot of data that reflects X-ray diffraction analysis of examples of VPP-PEDOT films.

FIG. 14 show plots of data that reflect X-ray diffraction of PEDOT films. These plots exhibit at least two peaks that include a first peak and a second peak that is smaller than the first peak. In one implementation, the first peak and the second peak occur at a diffraction angle of, respectively, about 25° 2θ and 12.5° 2θ. This feature is indicative of crystalline structures that are highly, or well, organized and likely to result in conductivity, e.g., of 1000 S/cm or greater, as noted above.

EXAMPLE IV

Figure 15:
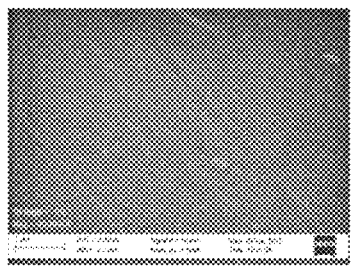
FIG. 15 depicts an SEM image of an example of VPP-PEDOT film on a PET substrate.
Figure 16:
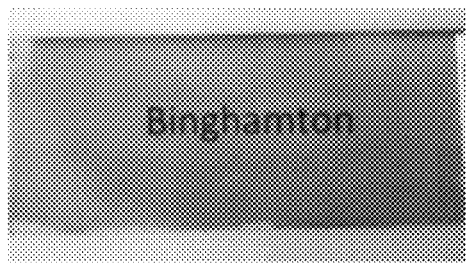
FIG. 16 depicts an image of an example of VPP-PEDOT film on a PET substrate to illustrate transparency of the film.
Figure 17:
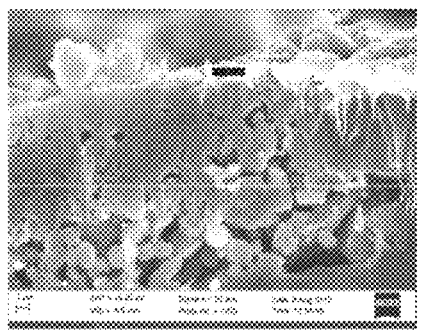
FIG. 17 depicts an SEM image of a cross-section of an example of VPP-PEDOT film disposed on porous substrate to illustrate penetration of film into substrate.

Example IV shows that vapor phase polymerization of PEDOT in accordance with the present disclosure can result in conductive films. FIGS. 15, 16, and 17 depict various images of examples of a VPP-PEDOT film made in accordance with the methods and process protocols outlined herein. The method utilized a process protocol with an exposure temperature of 50° C., an exposure time of 60 minutes, and a concentration of oxidant in the coating solution of 0.1M. FIG. 15 shows an SEM image to illustrates the uniformity of the surface of the film. FIG. 16 illustrates the high transparency of the film. FIG. 17 shows cross-section of an example of a VPP-PEDOT film that forms, and penetrates, a nano-porous substrate, e.g., a TiO$_2$ film.

In view of the foregoing, this disclosure contemplates various embodiments of the device and/or film, as well as systems and methods consistent therewith, a sample of which includes: A1. In one embodiment, a device comprising a substrate and a material layer disposed on the substrate, the material layer comprising a polymer having a first region comprising metal, the first region proximate the substrate. A2. In one embodiment of the device of A1, wherein the material layer has a conductivity of 200 S/cm or greater. A3. In one embodiment of the device of A1, wherein the material layer has a conductivity of 1000 S/cm or greater. A4. In one embodiment of the device of A1, wherein the substrate comprises a flexible material. A5. In one embodiment of the device of A1, wherein the substrate comprises a rigid material. A6. In one embodiment of the device of A1, wherein material layer has a second region, and wherein the concentration of metal in the first region is greater than the concentration of metal in the second region.

B1. In one embodiment, a film comprising poly(3,4-ethylenedioxythophene), wherein the film has a first region and a second region, and wherein the first region has a conductivity that is greater than the second region. B2. In one embodiment of the film of B1, wherein the first region has a concentration of metal that is greater than the concentration of metal in the second region. B3. In one embodiment of the film of B1, wherein the film comprises iron in the first region. B4. In one embodiment of the film of B1, wherein the film is flexible. B5. In one embodiment of the film of B1, wherein the film is transparent.

C1. In one embodiment, a method of forming a film on a substrate comprising exposing a substrate to a monomer source, the substrate having an oxidant layer disposed thereon, wherein the oxidant layer comprise metal. C2. In one embodiment of the method of C1, wherein the monomer source includes 3,4-ethylenedioxythiophene. C3. In one embodiment of the method of C1, wherein the monomer source includes a polymer that polymerizes in contact with the oxidant layer. C4. In one embodiment of the method of C1, further comprising depositing the oxidant layer. C5. In one embodiment of the method of C1, further comprising cleaning the substrate.

The embodiments include films and material layers that are flexible and/or transparent and/or conductive. These embodiments are the result of methods (and processes) that utilize various polymers polymerize to form the film, e.g., when in contact with an oxidant on a substrate. The resulting film can have conductive properties and, in one example, a region that is more conductive than another region of the film. This region of improved conductivity may arise proximate the substrate.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flexible film, comprising:
  a crystalline structure comprising poly(3,4-ethylenedioxythiophene), the crystalline structure is organized so as to exhibit a resistivity that varies by ±10% or less during flexure of the crystalline structure where said film is bent to form a pair of opposing, substantially parallel portions and a curved portion extending therebetween and flexure results from cycling, over at least 10 cycles, of the parallel portions relative to one another between a first spaced relationship to a second spaced relationship, which is smaller than the first spaced relationship,
  and to exhibit an x-ray diffraction pattern having a diffraction intensity with a first peak and a second peak that is smaller than the first peak, and wherein the first peak and the second peak occur at a diffraction angle of, respectively, 25 2θ and 12.5 2θ.

2. The flexible film of claim 1, wherein the crystalline structure has a conductivity of at least about 300 S/cm.

3. The flexible film of claim 1, wherein the crystalline structure has a first region comprising poly(3,4-ehtylenedioxythiophene)and a region comprising iron (Fe).

4. The flexible film of claim 1, wherein the crystalline structure has a conductivity of at least about 1000 S/cm.

5. A flexible film, comprising:
  a crystalline structure comprising poly(3,4-ethylenedioxythiophene), the crystalline structure is organized so as to exhibit a resistivity that varies by ±10% or less during flexure of the crystalline structure where said film is bent to form a pair of opposing, substantially parallel portions and a curved portion extending therebetween and flexure results from cycling, over at least 10 cycles, of the parallel portions relative to one another between a first spaced relationship and a second spaced relationship, which is smaller than the first spaced relationship, wherein the crystalline structure is also organized transmit 85% or more of light having a wavelength in a range of from about 400 nm to about 1100 nm.

6. The flexible film of claim 5, wherein the crystalline structure has a conductivity of at least about 300 S/cm.

7. The flexible film of claim 5, wherein the crystalline structure has a conductivity of at least about 1000 S/cm.

8. The flexible film of claim 5, wherein the crystalline structure comprises iron (Fe).

9. The flexible film of claim 5, wherein the crystalline structure has a stacked configuration with two regions, one having greater conductivity than the other.

10. A device, comprising:
a substrate;
a flexible film with a crystalline structure disposed on the substrate, the crystalline structure having a first region and a second region formed between the substrate and the first region, the first region comprising poly(3,4-ethylenedioxythiophene), the second region comprising an oxidant,
wherein the first region has a conductivity that is greater than the second region,
wherein the crystalline structure has a conductivity of at least about 300 S/cm, and
wherein the crystalline structure is organized so as to exhibit a resistivity that varies by ±10% or less during flexure of the crystalline structure where said film is bent to form a pair of opposing, substantially parallel portions and a curved portion extending therebetween and flexure results from cycling of the parallel portions between a first flexure dimension and a second flexure dimension, which is smaller than the first flexure dimension, over at least 10 cycles between the first flexure dimension and the second flexure dimension.

11. The device of claim 10, wherein the oxidant component comprises Fe(III) p-toluensulfonate.

12. The device of claim 10, wherein the crystalline structure exhibits an x-ray diffraction pattern having a diffraction intensity with a first peak and a second peak that is smaller than the first peak, and wherein the first peak and the second peak occur at a diffraction angle of, respectively, 25 2θ and 12.5 2θ.

13. The device of claim 10, wherein the substrate flexes with the flexible film during flexure.

14. The device of claim 10, wherein the film has a thickness that is 120 nm or less as measured from the substrate.

15. The device of claim 10, wherein the second region has a thickness that is 15 nm or less as measured from the substrate.

16. The device of claim 10, wherein the substrate comprises nano-pores that retain some of the flexible film therein.

17. The device of claim 10, wherein the crystalline structure is also organized to transmit 85% or more of light having a wavelength in a range of from about 400 nm to about 1100 nm.

* * * * *